United States Patent
Duan et al.

(10) Patent No.: US 8,255,352 B2
(45) Date of Patent: *Aug. 28, 2012

(54) METHOD FOR IMPLEMENTING A RULES-BASED ENGINE

(75) Inventors: Jinfan Duan, Redwood City, CA (US); Robert Wing, Foster City, CA (US); Piyush Govil, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/539,413

(22) Filed: Aug. 11, 2009

(65) Prior Publication Data

US 2009/0299942 A1    Dec. 3, 2009

Related U.S. Application Data

(63) Continuation of application No. 10/414,596, filed on Apr. 15, 2003, now Pat. No. 7,574,414.

(51) Int. Cl.
*G06N 5/02* (2006.01)

(52) U.S. Cl. .............................. 706/47; 705/20; 705/400

(58) Field of Classification Search .................... 706/47; 705/20, 400
See application file for complete search history.

(56) References Cited

U.S. PATENT DOCUMENTS

| | | | |
|---|---|---|---|
| 2002/0026368 A1* | 2/2002 | Carter, III | 705/20 |
| 2003/0046251 A1* | 3/2003 | Levine | 705/400 |
| 2007/0226064 A1* | 9/2007 | Yu et al. | 705/20 |

* cited by examiner

*Primary Examiner* — Kakali Chaki
*Assistant Examiner* — Mai T Tran
(74) *Attorney, Agent, or Firm* — Campbell Stephenson LLP

(57) ABSTRACT

Embodiments of the invention provide an RBE that uses a logical abstraction for a set of application rules that allows the rules to be implemented, presented and modified efficiently. For one embodiment, rules logic for implementing a set of application rules is stored. The rules logic is specified by a processing sequence using one or more application factors, each of which has one or more application factor values. A plurality of entries corresponding to each application factor is separately stored. Each entry contains a data point set having one or more data points and a result corresponding to the data point set. Each of the one or more data points of a data point set corresponds to a distinct factor value.

18 Claims, 6 Drawing Sheets

|   | CONSIDERATION 1 ↙ 301 | CONSIDERATION 2 ↙ 302 | RESULT ↙ 303 |
|---|---|---|---|
|   | CUSTOMER TYPE | LOCATION | DISCOUNT |
| 0. | PLATINUM | NEW YORK | 22% |
| 1. | GOLD | NEW YORK | 18% |
| 2. | SILVER | NEW YORK | 5% |
| 3. | PLATINUM | SAN FRANCISCO | 20% |
| 4. | GOLD | SAN FRANCISCO | 10% |
| 5. | SILVER | SAN FRANCISCO | 5% |
| 6. | PLATINUM | LOS ANGELES | 20% |
| 7. | GOLD | LOS ANGELES | 15% |
| 8. | SILVER | LOS ANGELES | 10% |
| . | . | . | . |
| . | . | . | . |
| . | . | . | . |
| . | . | . | . |
| . | . | . | . |
| . | . | . | . |
| N |   |   |   |

FIG. 3

METHOD FOR IMPLEMENTING A RULES-BASED ENGINE

CROSS-REFERENCE TO RELATED APPLICATIONS

This application is a continuation of U.S. application Ser. No. 10/414,596 filed Apr. 15, 2003, which is now U.S. Pat. No. 7,574,414, entitled "Method for Implementing a Rules-Based Engine," issued on Aug. 11, 2009 and naming Jinfan Duan, Robert Wing and Piyush Govil as inventors. This application is incorporated by reference herein, in its entirety and for all purposes.

FIELD

Embodiments of the invention relate generally to the field of rules-based engines ("RBE"s), and more particularly to RBEs that employ data abstraction, pattern matching, smart caching, object management and rules management.

BACKGROUND

Contemporary marketing strategies employ a multitude of marketing levers to increase market share and consumption, attract potential customers and reward faithful patrons. Complex pricing structures and associated pricing strategies, in conjunction with product selection, cross selling and up selling methodologies are often used as marketing levers used for increasing and maintaining demand patterns. Prices are quoted to customers through quotes and orders, which serve as a set of starting prices and associated adjustments leading to the final net prices charged to the customer. The final price offered to the customer is based on list pricing, along with associated pricing adjustments stored as pricing rules, and presented to the customer on their quote. Therefore, the final quoted price for a product or a service is the result of one or more adjustments made to a set of base (starting) prices. The adjustments may be based on many considerations around the product, customer and quote context including, for example; customer purchase volumes—historical as well as current purchases, product availability, customer loyalty, market segmentation, location, or other factors like customer age.

Rules-based processing systems are employed to determine which rules apply to any situation and to enforce the impact of such rules by applying discounts on the starting list price. These systems are used for determining applicable pricing schemes and for determining and enforcing the impact of rules in other similar applications. Automated rules may be enforced by specifying one or more conditions (also referred to as the application context) under which each result is applied. In existing systems, this may consist of defining a set of application rules from scratch (hard coding) or, at best, defining such rules using a rules-entry interface. An implementation sequence (application logic) for the set of application rules must also be defined. In existing systems, the application logic is either hard coded or maintained as a mixture of data and logic that are not completely separated from each other. This makes the system relatively inflexible and makes it hard to quickly and rapidly roll out price changes.

For typical industries implementing applications of average complexity, the number of application rules may be quite large. The number of rules processed at any time is large because the current applications process all rules that exist in the application at any point in time. For example, pricing rules within the hospitality (hotel) industry may require the consideration of location, room type, day-of-week, customer-type, customer-age and contracted rate, among others, in making adjustments to a base price. Each of these pricing considerations may have numerous data points outlining pricing adjustments. For example, a global vendor may have hundreds or even thousands of rules that have to be processed before a price can be quoted. The inter-combination of the various rule and data point considerations could easily lead to a system having well over 10,000 pricing rules and data items.

The typical available solutions have drawbacks in a number of areas, including system implementation, use and maintenance.

To implement such an RBE requires the creation of numerous rules along with the associated rule logic and the implementation of both (rules as well as logic) within a processing system, which means manually entering a large amount of code (hopefully with the aid of a rules-based syntax). This requires a good deal of time and a high level of expertise.

To use such a system requires storing a tremendous amount of data in memory. That is, the entire RBE, including all of the application rules and the accompanying logic, has to be loaded upfront to obtain a result. For example, to obtain a price quote, all of the pricing rules and application logic have to be initially downloaded to the local data base or application from a database server. Data points (i.e. pricing rules and data logic) for a particular customer, product, or fulfillment context are then interpreted to determine an adjustment to a base price. The rules-based pricing engine ("RBPE") then searches all pricing rules, regardless of whether they were relevant to the particular application context, and applies those rules relevant to the particular application context to determine a price adjustment. The price adjustment, if any, is applied to a base price to produce a price quote. This is time consuming and may lead to unacceptable response-time delays and scalability issues (e.g., a large number of users concurrently downloading a large amount of data).

Maintaining such a system also presents distinct difficulties that include the time, cost and level of expertise needed to make modifications to the application logic or application rules. A simple modification to a complex pricing structure may require changing the application code in many locations throughout an RBE. For example, this might include changing the way the application context for a particular rule is maintained and the way the corresponding result is searched. Depending on how the pricing rules have been coded, this could require a high level of expertise and could take days, weeks, or even months to accomplish a set of modifications. This process takes time and costs a lot of money, having a monetary cost commensurate with such an undertaking. Since new marketing strategies and their accompanying price structures must be implemented quickly and rapidly in connected as well as disconnected mobile user environments to exploit market trends or produce a desired impact on revenue streams, such delays in implementing modifications can have costly repercussions, including loss of customers, lower demand and extended sales cycles.

All of the above-noted disadvantages of currently available systems may be exacerbated if the application rules storage and associated rule processing is not efficiently coded. For example, an RBE may include a particular application context that in all cases produces the same result. However, due to inefficient coding, the RBE may lack the logic to implement the rule efficiently, since not all rules need to fire repeatedly.

SUMMARY

Embodiments of the invention provide an RBE that uses a logical abstraction for a set of application rules that allows the rules to be implemented, presented and modified efficiently. For one embodiment, rules logic for implementing a set of application rules is stored. The rules logic is specified by a processing sequence using one or more application factors, each of which has one or more application factor values. A plurality of entries corresponding to each application factor is stored separately. Each entry contains a data point set having one or more data points, and a result corresponding to the data point set. Each of the one or more data points of a data point set corresponds to a distinct factor value.

Other features and advantages of embodiments of the present invention will be apparent from the accompanying drawings and from the detailed description that follow below.

BRIEF DESCRIPTION OF THE DRAWINGS

The invention may be best understood by referring to the following description and accompanying drawings that are used to illustrate embodiments of the invention. In the drawings:

FIG. 3 illustrates a table having entries that specify a data point for each factor value of a pricing factor, together with the corresponding result, in accordance with one embodiment of the invention;

DETAILED DESCRIPTION

Overview

Figure 1:
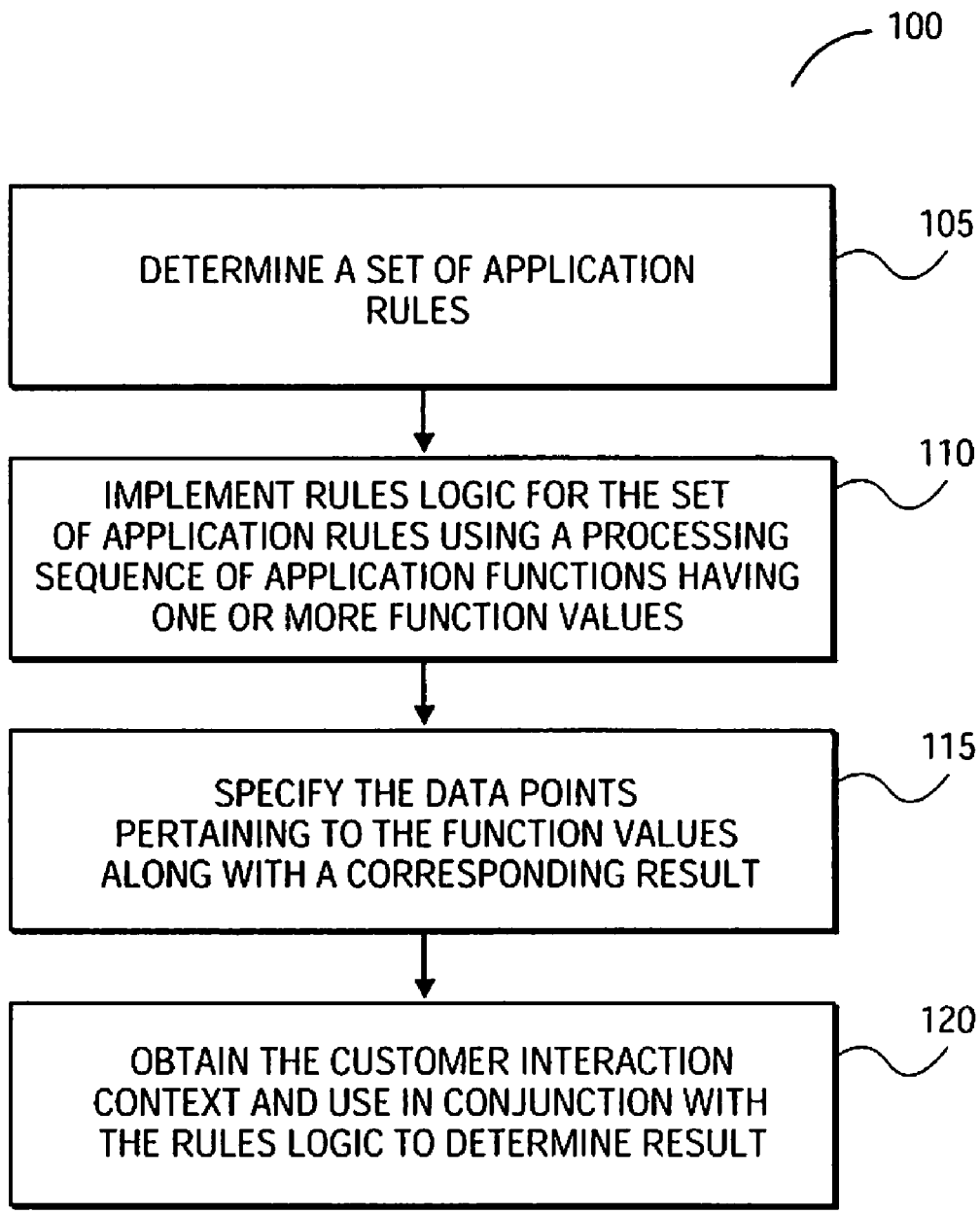
FIG. 1 illustrates a process in which an RBPE is implemented and used in accordance with an embodiment of the invention.

Embodiments of the invention address the development of a generic rules-based engine and its extension to solving the product selection, customer eligibility and product pricing problems. Embodiments of the invention provide a logical abstraction for a set of application rules and a framework allowing the rules to be efficiently implemented, presented and modified.

For one embodiment, the invention provides a generic pattern matching rules-based pricing engine with the application of pattern matching to improve performance and automate system management; accompanied by data structures and algorithms that efficiently process the rules while maintaining efficiently configured data cache. The rules-based engine will be applied for solving pricing, product selection and customer eligibility problems.

For one embodiment, the application rules are implemented using a plurality of application factors. The customer can use one or more of the application factors based upon the rules the customer wishes to express. Each application factor includes one or more factor values (considerations), which are used to drive the application. Data points (input values) are applied to each factor value of an application factor to specify a corresponding result, which may, for various embodiments, be an adjustment to a baseline result. For one embodiment, a user can edit a rule logic flow chart to rearrange the sequence of how the application factors apply to effectively change the rule logic.

For one embodiment, the application rules are implemented as separately stored tabular entries that indicate a set of data points and its corresponding result. For such an embodiment, pattern matching may be employed to display and access some of the application rules based upon the factors and factor values used to implement those rules. For one embodiment, a user can edit a tabular entry to change a data point or the result of an application rule.

For one embodiment, using pattern matching and data caching techniques and creating an application context that limits the number of rules and data loaded for processing substantially reduces the number of rules that need to be processed.

In accordance with one embodiment, the application of a rules-based engine can also be extended to other application areas like product selection and customer eligibility determination. During product selection, a set of rules determine the products that can be selected based on product compatibility rules across multiple products and product lines (applied for a given product and customer interaction context). Likewise, eligibility (e.g., which customer is allowed to buy which product) is based on the customer context.

In the following description numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. Moreover, inventive aspects lie in less than all features of a single disclosed embodiment. Thus, the claims following the Detailed Description are hereby expressly incorporated into this Detailed Description, with each claim standing on its own as a separate embodiment of this invention.

Although embodiments of the invention apply to RBEs for various applications, for clarity, aspects of the invention will be described below in reference to an exemplary RBPE.

Application Factors

An embodiment of the invention uses one or more application factors to implement application rules. Application factors may take on many different forms. However, within a particular application (e.g., pricing), there are several generic factors that may be used to implement commonly used rules. The following are exemplary application factors that, among others, are applicable to a pricing application.

Single consideration factor: This pricing factor allows for implementation of the pricing rule determined by a single variable or factor value. For example, some pricing rules provide a substantial discount based upon customer age (e.g., senior citizen discounts, or child fares).

Volume purchase factor: This pricing factor allows implementation of the common pricing rule of reducing unit price for volume purchases. For example, a purchase of a given amount of a product or a purchase surpassing a given monetary value threshold may result in a corresponding reduction in price. When using several data points, this factor may express complex volume purchase discount schemes.

Customizable product factor: This pricing factor allows a product price to be adjusted based on whether or not the product is part of an overall sellable bill of material containing a hierarchy of products, including substitution of products and application of product attributes. For example, a spare part for an automobile is typically sold at a much higher rate when sold as a spare as compared to when sold as a part of the automobile itself.

Matrix factor: This pricing factor can implement pricing rules based on various factor values, as described above, but can also access data points for such factor values from a variety of sources. For example, if a particular customer has a purchasing contract with the vendor that specifies a price rule, the matrix factor is able to access that data and present the price rule within a matrix (table) that provides a correspondence between a data point set for the factor values and a particular result.

Typically each industry expresses pricing rules in very different ways. However, vendors tend to have many common pricing factors and common implementation sequences for the pricing factors within a specific industry. For example, pricing in the hospitality industry has several almost universal concepts that allow an embodiment of the invention to be substantially pre-built. That is, a number of defined pricing factors and implementation sequences are provided.

System Implementation

FIG. 1 illustrates a process in which an RBPE is implemented and used in accordance with an embodiment of the invention. Process 100, shown in FIG. 1, begins with operation 105 in which, for example, a pricing administrator determines a set of pricing rules to effect various marketing schemes or reflect market conditions. The pricing administrator may determine a base price and a number of pricing rules, each of which specifies an adjustment to the base price.

At operation 110 the pricing administrator implements the rule logic for the set of pricing rules using one or more pricing factors. The pricing administrator selects one or more pricing factors and determines the processing sequence for each pricing factor and what affect the pricing factor will have on the result.

For one embodiment, an organization mechanism (e.g., a flowchart) is used to provide an administrative view of the processing sequence of the pricing rule logic for ease of organization and editing. For example, a pricing administrator may wish to implement a price discount based upon customer loyalty for given locations as well as a discount for senior citizens, and provide the greater of the two discounts.

Figure 2:
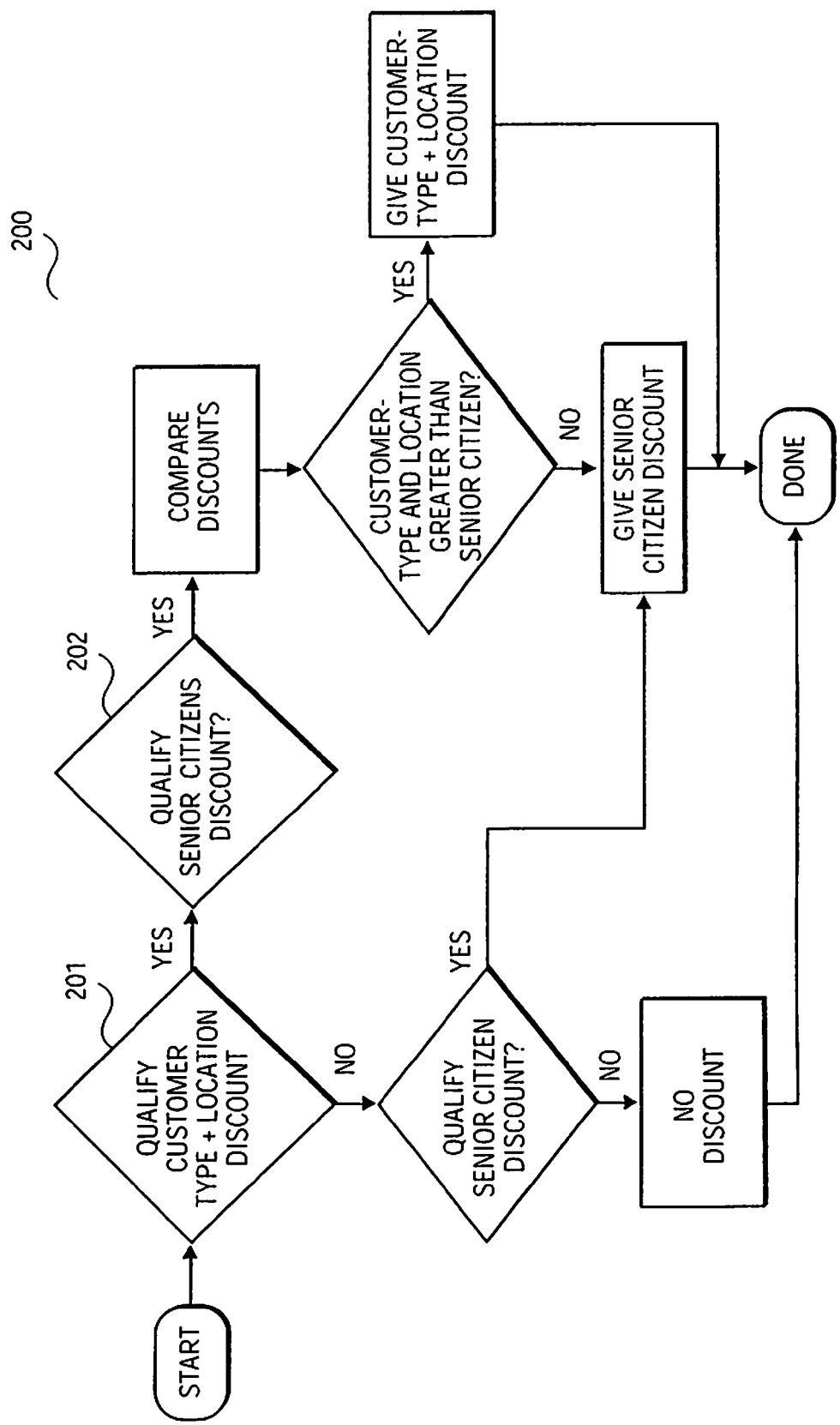
FIG. 2 illustrates a flow chart that may be used to implement pricing rules in accordance with one embodiment of the invention.

FIG. 2 illustrates a flow chart that may be used to implement pricing rule logic in accordance with one embodiment of the invention. Flow chart 200, shown in FIG. 2, implements a pricing factor 201 containing two factor values, namely "customer type" and "location." For example, customer type may indicate the particular customer's status vis-à-vis the vendor, while location may be the geographical location of the vendor (or customer) by city or country. The pricing factor 201 may be implemented as a matrix pricing factor. Flow chart 200 also implements another pricing factor 202 containing the factor value of "senior citizen." The senior citizen factor value may be implemented as a single consideration pricing factor, or may be implemented as a matrix pricing factor. Because pricing factors 201 and 202 are common in certain industries, they may be included in a set of pre-built generic pricing factors, which may then be adjusted in accordance with user-specific needs.

The rule logic, which dictates the processing sequence for the pricing factors and determines that the larger of the two discounts should apply (i.e., versus applying the smaller, or both, discounts), is defined by the pricing administrator or may be pre-set as well.

Referring again to FIG. 1, at operation 115 the pricing administrator specifies the data points pertaining to the factor values of the pricing rules (i.e., name-value pairs). The pricing administrator also specifies a corresponding result for each name-value pair, thereby implementing each pricing rule. For example, the pricing administrator may specify that, for a "gold" customer located in "New York," the discount is "18%," therefore the name-value pair, gold/New York corresponds to a result of 18% off base price. The data points and corresponding results may be specified as tabular entries in a table abstracted from the pricing factors.

FIG. 3 illustrates a table having entries 0-N that specify a data point for each factor value of a pricing factor, together with the corresponding result, in accordance with one embodiment of the invention. Table 300, shown in FIG. 3, includes a column for each factor value of the pricing factor 201. Column 301 contains a number of data points for factor value "Customer Type," while column 302 contains a number of data points for factor value "Location." Table 300 also contains a column 303 that contains a result for each corresponding data point set or name/value pair set. A data point set contains a data point for each factor value of the pricing factor.

Referring again to FIG. 1, at operation 120 the customer interaction context ("CIC") is used in conjunction with the rules logic, pertinent application factors and factor values to determine a result. The CIC consists of the available information pertaining to a customer in relation to a particular transaction (e.g., a purchase). For example, the CIC may include, for a purchase transaction, the item purchased, the name and status of the customer, the date of purchase or price quote, etc. In general, the CIC includes all available information that may affect the transaction, (e.g., that affects the purchase price). The CIC provides a correspondence with one or more factor values of the application factors.

System Use

Figure 4:
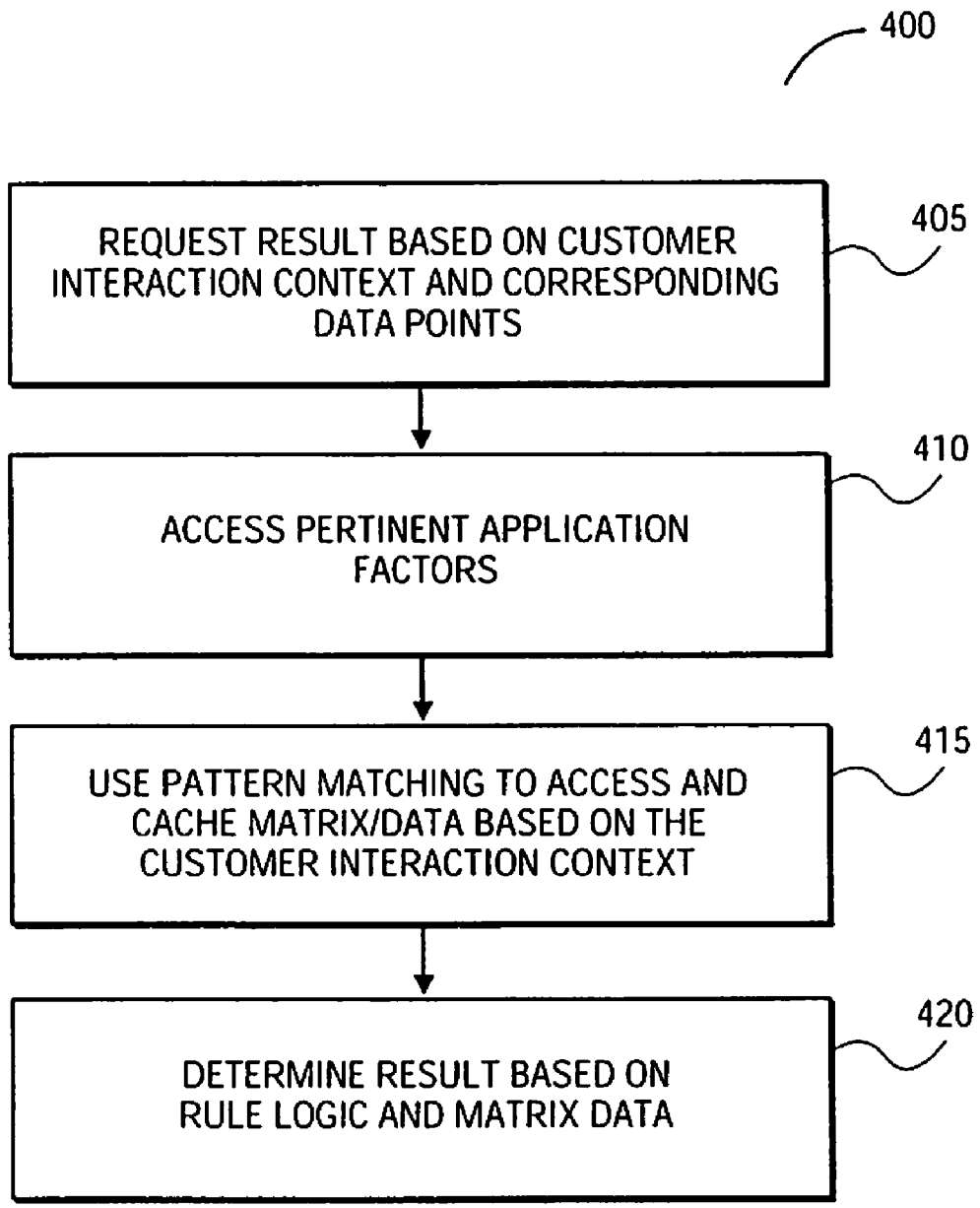
FIG. 4 illustrates a method for obtaining a result from an RBE in accordance with one embodiment of the invention.

FIG. 4 illustrates a method for obtaining a result from an RBE in accordance with one embodiment of the invention. Process 400, shown in FIG. 4, begins at operation 405 in which a result (e.g., a price quote) is requested. The request is based upon the CIC and includes corresponding data points. For example, the hotel industry may have pricing rules that initially consider whether the customer is a government employee and the location of the hotel. That is, the hotel may have a contract that specifies a fixed rate for government employees that only varies by hotel location.

At operation 410 the system accesses the pricing factors needed to obtain the requested price quote. That is, the system accesses and loads the pertinent information from storage memory. This may mean downloading from a portable storage medium to a personal processing system for small organizations, or downloading from a server, via a network, to multiple remote processing systems for larger organizations. For one embodiment, only the pricing factors needed to obtain the requested price quote are loaded. That is, because the system separates the logical constructs of the pricing rules from the specific data points that implement each rule, only a relatively small amount of data needs to be loaded.

At operation 415 the system uses pattern matching to obtain the relevant information. That is, pattern matching is used to access and cache the matrix/data based on the CIC. For example, if "government employee" and "location" are included within the CIC to be used as a basis for a price quote, and the pricing logic dictates primacy, then the system processes only the pertinent application factors and the request process is directed to a table that maps these two factor values to a price result. For one embodiment, the CIC information is maintained in cache as a vector to facilitate pattern matching.

At operation 420 the result, based upon rule logic, and the data points provided in the request, is determined. The result may be determined by direct look-up from the appropriate table. That is, rather than search through every rule of a complex pricing structure, the rule logic, using the segment field, directs the search to a table that has a number of entries specifying location and the corresponding government employee rate (or applicable discount from base rate). For one embodiment, the RBPE caches the result for future use.

System Maintenance

RBEs frequently require modification to one or more rules, as discussed above. In accordance with one embodiment of the invention, the separation of the logical constructs of the pricing rules from the specific data points that implement each rule allows modification of the rule logic independent of modification of specific rules.

For example, a user may decide to eliminate or add a pricing factor or rearrange the processing sequence of the pricing factors. An embodiment of the invention provides the ability to modify the rule logic by accessing and editing the flow chart that implements the rule logic. Referring to FIG. 2, a pricing administrator may decide to discontinue a discount for senior citizens and may therefore wish to remove pricing factor 202 from flow chart 200. Such changes to the pricing logic are relatively infrequent and require a user with a relatively high level of expertise to determine which modifications to implement. An embodiment of the present invention provides a graphical user interface with a drag-and-drop feature to allow quick and efficient modifications to the rule logic.

Modifying specific rules is required more frequently. For example, a number of pricing managers at various locations may require the ability to periodically modify specific pricing rules. For example, a pricing factor for a hotel room rate may include a factor value of the "day-of-the-week" and offer a substantial discount for certain days including "Wednesday." It may be desirable to modify the data points or the corresponding result of this rule if room rate availability in a given city is particularly low for some reason (e.g., a local convention) on Wednesday. In such a case, a pricing manager at the particular location can access the table containing the specific data point set and corresponding result and edit the result as desired (e.g., from a 25% discount to a 50% increase for Wednesday). Alternatively or additionally, the editing described can be used to make modifications to the data points. This has the advantage of allowing users with a modest level of expertise (e.g., local pricing managers) to modify specific rules, while restricting the ability to modify the rule logic to a smaller number of users (e.g., system-wide pricing administrators) having a relatively higher level of expertise.

General Matters

Embodiments of the invention may be applied to provide an RBE that provides a logical abstraction for a set of application rules and a framework allowing the rules to be efficiently implemented, presented and modified. The RBE implements a set of rules using a number of application factors, each including one or more factor values. For one embodiment, data points (input values) are applied to each factor value of an application factor to specify a corresponding result, which may for various embodiments be an adjustment to a base result. For one embodiment, a user can rearrange the sequence of how the application factors apply to effectively change the rule logic. For one embodiment, dynamic context caching is used to reduce the amount of data that has to be loaded, thereby reducing system response time.

Importantly, while several embodiments of the invention have been described in the context of pricing within the hospitality industry, embodiments of the invention may be likewise applicable to other aspects of the hospitality industry, such as availability, as well as to other industries such as manufacturing, communication, or travel. For example, embodiments of the invention may be applied to product availability in the manufacturing industry or service availability in the communication or travel industries. In general, embodiments of the invention are applicable to any set of interrelated data that can be addressed through rules-based matching.

Figure 5:
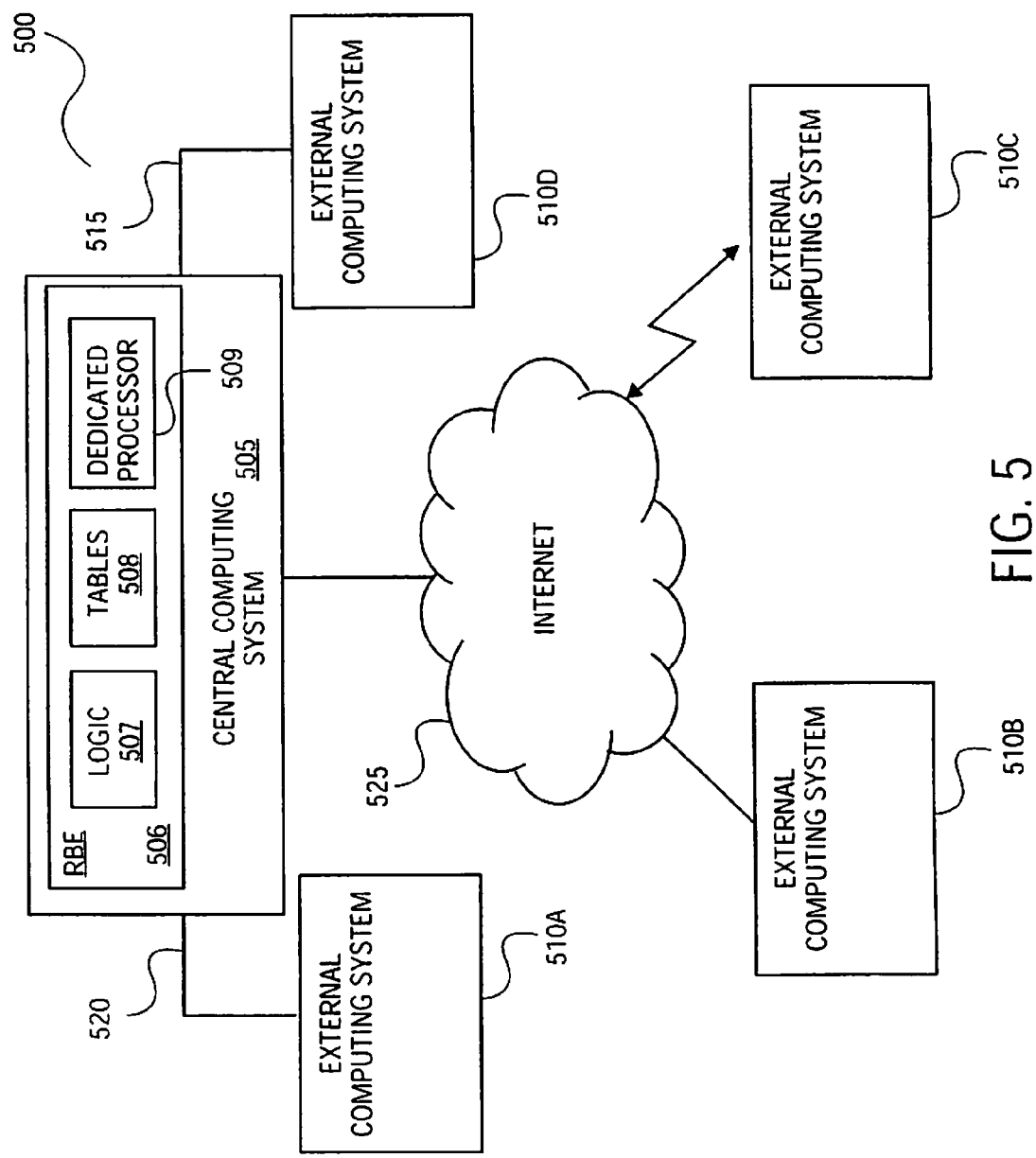
FIG. 5 illustrates a network of computing systems in which the implementation, use and modification of an RBE may be effected in accordance with one embodiment of the invention.

FIG. 5 illustrates a network of computing systems in which the implementation, use and modification of an RBE may be effected in accordance with one embodiment of the invention. Network 500 includes a central computing system (digital processing system) 505 having an RBE 506 stored thereon. The RBE 506 may contain rule logic 507 and separately stored tabular entries 508 containing data point sets for factor values and corresponding results. For one embodiment, the RBE 506 may also contain a dedicated processor 509 to interpret the rules logic and process it in a specified manner. A plurality of local or remote external computing systems 510A-510D are coupled to the central computing system.

The central computing system 505 may be coupled to external computing systems over short distances as part of a local area network ("LAN") 515. Additionally or alternatively, the central computing system 505 may be coupled to external computing systems over long distances via telephone lines or satellite links as part of a wide area network 520 ("WAN") or over the Internet 525. The Internet 525 is a network of networks through which information is exchanged via the use of protocols (e.g., TCP, IP) as known in the art.

For purposes of illustrating an embodiment of the invention, network 500 may be viewed as the computer network of a multi-location organization having a computing system 505, having an RBE 506 and several remote computing systems each accessing the RBE 506 to provide price quotes. For one embodiment, the RBPE supports multi-currency price quotes for multi-national organizations.

Figure 6:
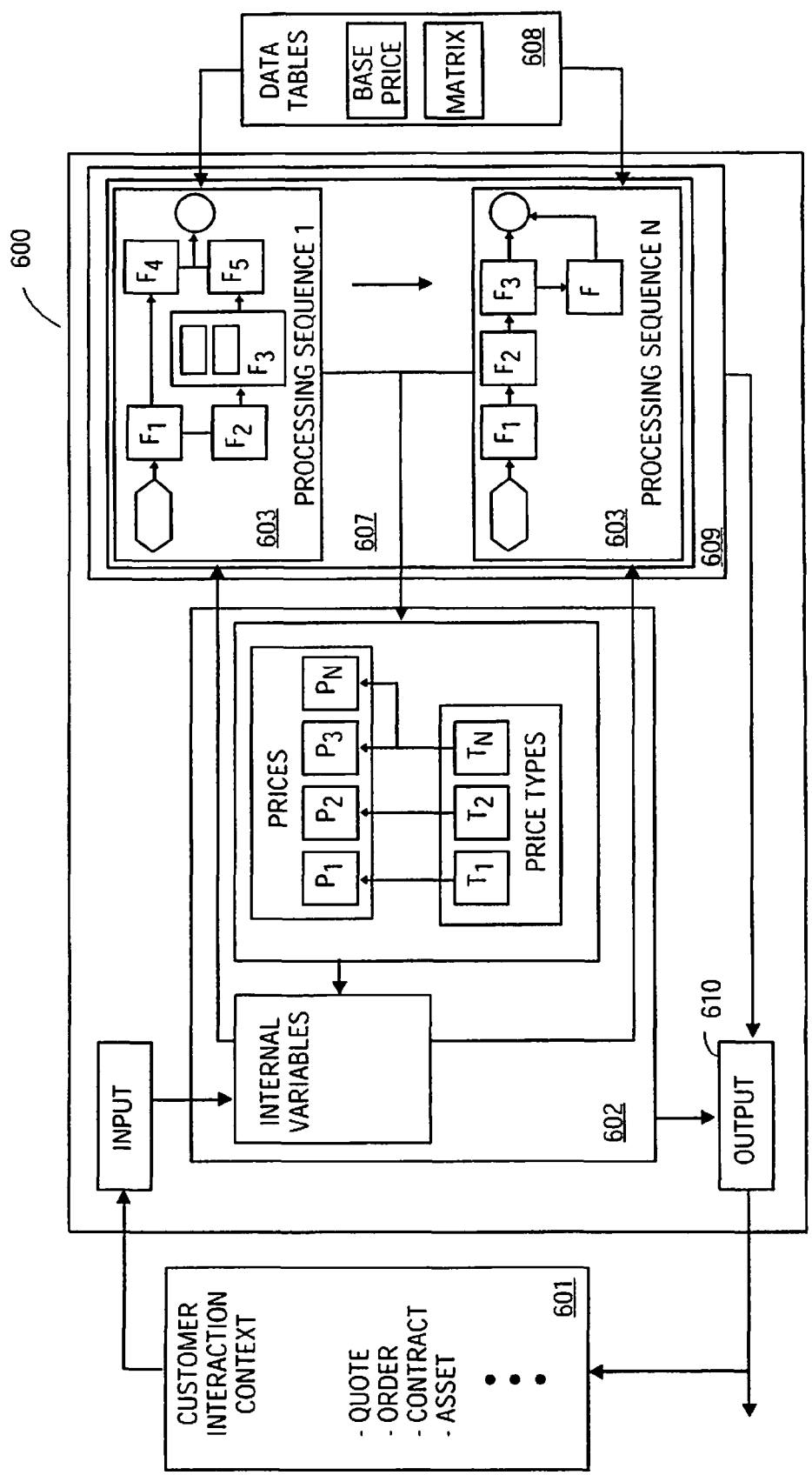
FIG. 6 illustrates an exemplary implementation of an RBPE in accordance with one embodiment of the invention.

FIG. 6 illustrates an exemplary implementation of an RBPE in accordance with one embodiment of the invention. RBPE 600, shown in FIG. 6, includes a memory or database 601 that stores the CIC data or source objects in general. As described above, the CIC includes information about a customer relative to a particular purchase.

I/O mechanism 602 allows the CIC data to be cached. For one embodiment, the data is cached as a vector to facilitate pattern matching.

Dedicated processor 609 obtains the rules logic 607 that contains a number of processing sequences 603. The processing sequences may be implemented for administration as function flow designers.

The processor 609 uses pattern matching to compare the CIC data with the application factor values of the processing sequences 603. If the CIC data is such that a given factor is not relevant to the transaction, then that factor is not processed. This greatly reduces required time and processing resources to obtain the result (e.g., price quote).

Based on the CIC data, the processor 609 obtains the data points corresponding to the processed application factors, together with the corresponding result, from data storage 608. Data storage 608 may include a variety of data sources, including a base price list, matrix tables and other internal or external data sources.

The result is provided via output 610. For one embodiment, the result provides details regarding the adjustments made to the base price (i.e., a waterfall output).

The invention includes various operations. It will be apparent to those skilled in the art that the operations of the invention may be performed by hardware components or may be embodied in machine-executable instructions, which may be used to cause a general-purpose or special-purpose processor, or logic circuits programmed with the instructions, to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

Many of the methods are described in their most basic form, but operations can be added to or deleted from any of the methods without departing from the basic scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a request for a requested result for a transaction, wherein
      the request comprises a customer interaction context,
      the customer interaction context comprises input information corresponding to an input data set, and
      the input data set comprises one or more input values;
   determining, using the customer interaction context, one or more relevant application factors relevant to the transaction, wherein
      the one or more relevant application factors are determined from a plurality of application factors, and
      the customer interaction context corresponds to the one or more relevant application factors;
   determining at least one application factor from the one or more relevant application factors on which to base the requested result, wherein
      the one or more relevant application factors comprise one or more factor values, and
      said determining the at least one application factor comprises
         comparing the one or more input values with the one or more factor values associated with the one or more relevant application factors, wherein
            at least one input value matches at least one factor value, and the at least one factor value is associated with the at least one application factor; and
   determining the requested result using the at least one application factor, wherein
      the determining the one or more relevant application factors, the determining the at least one application factor, and the determining the requested result are performed by a processor.

2. The method of claim 1 wherein said determining the at least one application factor comprises:
   comparing the input data set to one or more entries in a table, wherein
      each of the entries correspond to one of the one or more relevant application factors,
      each entry in the table comprises
         a data point set corresponding to a distinct factor value, and
         a result associated with the data point set, and
      the data point set comprises one or more data points.

3. The method of claim 1 wherein said determining the requested result further comprises:
   processing the at least one application factor according to a processing sequence implemented by rules logic, wherein
      the processing sequence indicates an order in which the rules logic uses the at least one application factor to determine the requested result.

4. The method of claim 1 further comprising:
   accessing information associated with the one or more relevant application factors.

5. The method of claim 4 wherein said accessing comprises:
   downloading the information from a server storing the information.

6. The method of claim 5 wherein said accessing further comprises:
   storing the downloaded information in a local table subsequent to said downloading.

7. A system comprising:
   an external digital processing system comprising:
      a processor, and
      the external digital processing system is configured to send a request to a central digital processing system; and
   the central digital processing system, coupled to the external digital processing system, and configured to:
      receive the request for a requested result for a transaction, wherein
         the request comprises a customer interaction context,
         the customer interaction context comprises input information corresponding to an input data set, and
         the input data set comprises one or more input values;
      determine, using the customer interaction context, one or more relevant application factors relevant to the transaction, wherein
         the one or more relevant application factors are determined from a plurality of application factors, and
         the customer interaction context corresponds to the one or more relevant application factors;

determine at least one application factor from the one or more relevant application factors on which to base the requested result, wherein the one or more relevant application factors comprise one or more factor values, and said determination of the at least one application factor comprises comparison of the one or more input values with the one or more factor values associated with the one or more relevant application factors, wherein at least one input value matches at least one factor value, and the at least one factor value is associated with the at least one application factor; and determine the requested result using the at least one application factor.

8. The system of claim 7 wherein the central digital processing system configured to determine the at least one application factor is further configured to:

compare the input data set to one or more entries in a table, wherein each of the entries correspond to one of the one or more relevant application factors, each entry in the table comprises a data point set corresponding to a distinct factor value, and a result associated with the data point set, and the data point set comprises one or more data points.

9. The system of claim 7 wherein the central digital processing system further comprises a memory storing rules logic, and the central digital processing system configured to determine the requested result is further configured to:

process the at least one application factor according to a processing sequence implemented by the rules logic, wherein the processing sequence indicates an order in which the rules logic uses the at least one application factor to determine the requested result.

10. The system of claim 7 wherein the central digital processing system is further configured to:

access information associated with the one or more relevant application factors.

11. The system of claim 10 wherein the central digital processing system configured to access the information is further configured to:

download the information from data storage coupled to the central digital processing system.

12. The system of claim 11 wherein the central digital processing system is further configured to:

store the downloaded information in a local table subsequent to said downloading.

13. A non-transitory machine-readable storage medium storing instructions executable by a processor, the instructions comprising:

a first set of instructions configured to receive a request for a requested result for a transaction, wherein the request comprises a customer interaction context, the customer interaction context comprises input information corresponding to an input data set, and the input data set comprises one or more input values;

a second set of instructions configured to determine, using the customer interaction context, one or more relevant application factors relevant to the transaction, wherein the one or more relevant application factors are determined from a plurality of applications factors, and the customer interaction context corresponds to the one or more relevant application factors;

a third set of instructions configured to determine at least one application factor from the one or more relevant application factors on which to base the requested result, wherein the one or more relevant application factors comprise one or more factor values, and the third set of instructions comprise further instructions configured to compare the one or more input values with the one or more factor values associated with the one or more relevant application factors, wherein at least one input value matches at least one factor value, and the at least one factor value is associated with the at least one application factor; and a fourth set of instructions configured to determine the requested result using the at least one application factor.

14. The non-transitory machine-readable storage medium of claim 13, wherein the third set of instructions further comprises:

a fifth set of instructions configured to compare the input data set to one or more entries in a table, wherein each of the entries correspond to one of the one or more relevant application factors each entry in the table comprises a data point set corresponding to a distinct factor value, and a result associated with the data point set, and the data point set comprises one or more data points.

15. The non-transitory machine-readable storage medium of claim 13 wherein a fifth set of instructions implements rules logic, and the fourth set of instructions further comprises:

a sixth set of instructions configured to process the at least one application factor according to a processing sequence implemented by the rules logic, wherein the processing sequence indicates an order in which the rules logic uses the at least one application factor to determine the requested result.

16. The non-transitory machine-readable storage medium of claim 13 wherein the instructions further comprise:

a fifth set of instructions configured to access information associated with the one or more relevant application factors.

17. The non-transitory machine-readable storage medium of claim 16 wherein the fifth set of instructions further comprise:

a sixth set of instructions configured to download the information from a server storing the information.

18. The non-transitory machine-readable storage medium of claim 17 wherein the fifth set of instructions further comprise:

a seventh set of instructions configured to store the downloaded information in a local table subsequent to said downloading.

* * * * *

UNITED STATES PATENT AND TRADEMARK OFFICE
CERTIFICATE OF CORRECTION

| | | |
|---|---|---|
| PATENT NO. | : 8,255,352 B2 | |
| APPLICATION NO. | : 12/539413 | |
| DATED | : August 28, 2012 | |
| INVENTOR(S) | : Duan et al. | |

It is certified that error appears in the above-identified patent and that said Letters Patent is hereby corrected as shown below:

IN THE CLAIMS:

In column 12, line 5, in Claim 13, delete "applications" and insert -- application --, therefor.

Signed and Sealed this
Eleventh Day of December, 2012

David J. Kappos
*Director of the United States Patent and Trademark Office*